(12) United States Patent
Holly et al.

(10) Patent No.: US 8,677,633 B2
(45) Date of Patent: Mar. 25, 2014

(54) WORKPIECE GUARD AND BLADE GUARD FOR BAND SAW

(75) Inventors: Jeffrey Holly, West Bend, WI (US); Jeffrey M. Wackwitz, Pewaukee, WI (US); Scott D. Bublitz, Hartland, WI (US); Steven W. Hyma, Milwaukee, WI (US); Kurt Limberg, Milwaukee, WI (US); John G. Marx, Hartford, WI (US); Richard J. LaSota, Pewaukee, WI (US); Ryan J. Denissen, Sussex, WI (US); John S. Scott, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 44 days.

(21) Appl. No.: 13/153,090

(22) Filed: Jun. 3, 2011

(65) Prior Publication Data

US 2011/0296696 A1    Dec. 8, 2011

Related U.S. Application Data

(60) Provisional application No. 61/351,118, filed on Jun. 3, 2010.

(51) Int. Cl.
*B23D 53/12* (2006.01)
*B23D 55/06* (2006.01)

(52) U.S. Cl.
USPC .............................. 30/380; 83/397.1; 83/398

(58) Field of Classification Search
USPC .............. 30/286, 295, 380; 83/397, 398, 478, 83/DIG. 1, 397.1, 820; D8/64
See application file for complete search history.

(56) References Cited

U.S. PATENT DOCUMENTS

| | | | |
|---|---|---|---|
| 2,032,233 A | 2/1936 | Tautz | |
| 2,596,081 A | 5/1952 | Sacrey | |
| 2,722,953 A | 11/1955 | Lee | |
| 2,827,085 A | 3/1958 | Ocenasek | |
| 3,621,894 A * | 11/1971 | Niksich | 30/380 |
| 3,658,102 A | 4/1972 | Joosten | |
| 3,829,970 A | 8/1974 | Anderson | |
| 3,830,131 A | 8/1974 | Wells | |
| 3,848,502 A | 11/1974 | O'Neill | |
| 3,961,550 A | 6/1976 | Oliver et al. | |

(Continued)

FOREIGN PATENT DOCUMENTS

| | | |
|---|---|---|
| JP | 2006212807 | 8/2006 |
| JP | 2007260795 | 10/2007 |
| JP | 2008207272 | 9/2008 |
| KR | 100782521 | 12/2007 |

OTHER PUBLICATIONS

PCT/US2011/039134 International Search Report and Written Opinion dated Feb. 17, 2012.

*Primary Examiner* — Hwei C Payer
(74) *Attorney, Agent, or Firm* — Michael Best & Friedrich LLP

(57) ABSTRACT

A hand-held band saw has a handle for grasping the band saw, a motor, a drive wheel driven by the motor, a driven wheel and a continuous blade disposed about the drive wheel and the driven wheel. A portion of the continuous blade is positioned in a cut zone to perform a cutting operation. A workpiece guard is spaced from the continuous blade and positioned generally between the cut zone and the handle for limiting movement of the workpiece after the cutting operation.

27 Claims, 16 Drawing Sheets

(56) References Cited

U.S. PATENT DOCUMENTS

| | | |
|---|---|---|
| 3,974,724 A | 8/1976 | Shadle |
| 4,001,937 A | 1/1977 | Stelljes et al. |
| 4,160,320 A | 7/1979 | Wikoff |
| 4,204,444 A | 5/1980 | Kohr |
| 4,413,414 A * | 11/1983 | Strzalka ............ 30/380 |
| 4,615,464 A | 10/1986 | Byrns |
| 4,630,372 A | 12/1986 | Nagashima |
| 4,711,032 A | 12/1987 | Rickmers et al. |
| 4,953,295 A | 9/1990 | Barradas et al. |
| 5,251,525 A | 10/1993 | Galloway |
| 5,288,453 A | 2/1994 | Rutenbeck et al. |
| 5,388,334 A * | 2/1995 | Halsey ............ 30/509 |
| 6,659,276 B2 | 12/2003 | Anderson et al. |
| 6,691,599 B2 | 2/2004 | Kao |
| 6,793,074 B2 | 9/2004 | Anderson et al. |
| 6,829,830 B2 | 12/2004 | O'Banion |
| 6,837,134 B2 | 1/2005 | Chin-Chin |
| 6,857,347 B1 | 2/2005 | Benedict et al. |
| 6,988,633 B2 | 1/2006 | Grinnall et al. |
| D527,967 S * | 9/2006 | Klingbeil et al. ............ D8/64 |
| 7,287,454 B2 | 10/2007 | McIntosh |
| 7,331,111 B2 | 2/2008 | Myers |
| 7,510,468 B2 | 3/2009 | Clifford et al. |
| 7,849,604 B2 | 12/2010 | McIntosh et al. |
| 7,926,187 B2 | 4/2011 | Uehlein-Proctor et al. |
| 2004/0139835 A1 | 7/2004 | Wright et al. |
| 2005/0188550 A1 | 9/2005 | Uehlein-Proctor et al. |
| 2007/0068011 A1 | 3/2007 | Shibata et al. |
| 2008/0000093 A1 | 1/2008 | McIntosh |
| 2008/0005912 A1 | 1/2008 | McIntosh |
| 2008/0006136 A1 | 1/2008 | McIntosh |
| 2008/0282556 A1 | 11/2008 | McIntosh |
| 2009/0265943 A1 | 10/2009 | Miller et al. |
| 2010/0018064 A1 | 1/2010 | Bertsch et al. |
| 2010/0018371 A1 | 1/2010 | Wilbert |
| 2010/0024225 A1 | 2/2010 | Wackwitz |
| 2010/0095537 A1 | 4/2010 | Serdynski et al. |

* cited by examiner

WORKPIECE GUARD AND BLADE GUARD FOR BAND SAW

CROSS REFERENCE TO RELATED APPLICATION

This application claims priority to co-pending U.S. Provisional Patent Application No. 61/351,118 filed on Jun. 3, 2010, the entire contents of which are incorporated herein by reference.

BACKGROUND

The present invention relates to power tools, and more particularly to band saws.

Band saws typically include a continuous band saw blade disposed about a pair of pulleys, or wheels, and driven by one of the pulleys, and a guard surrounding an outer circumference of the band saw blade. The guard covers the side of the band saw blade as it rotates about the wheels and protects the band saw blade from being disrupted and/or misaligned. The bottom of the band saw is open such that the band saw blade and pulleys are accessible for removal to facilitate band saw blade replacement.

SUMMARY OF THE INVENTION

The invention provides, in one aspect, a hand-held band saw having a handle for grasping the band saw, a motor, a drive wheel driven by the motor, a driven wheel and a continuous blade disposed about the drive wheel and the driven wheel. A portion of the continuous blade is positioned in a cut zone to perform a cutting operation. A workpiece guard is spaced from the continuous blade and positioned generally between the cut zone and the handle for limiting movement of the workpiece after the cutting operation.

In another aspect, the invention provides a hand-held band saw for cutting a workpiece. The hand-held band saw includes a housing defining a front and a rear, the housing having an opening in the front defining a cut zone and a first housing portion generally located on a first side of the opening and a second housing portion generally located on a second side of the opening. The band saw also includes a first wheel supported by the first housing portion, a second wheel supported by the second housing portion, and a motor operably coupled to the first wheel. The band saw also includes a handle disposed proximate the rear of the housing, the handle having a grip portion extending between the first housing portion and the second housing portion. The band saw also includes a continuous blade supported by the first and second wheels, wherein a portion of the continuous blade is positioned in the cut zone to perform a cutting operation, and a workpiece guard substantially traversing the cut zone for limiting movement of the workpiece after the cutting operation.

In another independent aspect, the invention provides a hand-held band saw for cutting a workpiece. The hand-held band saw includes a deck defining a front and a rear, the deck having an opening in the front defining a cut zone and a first deck portion generally located on a first side of the opening and a second deck portion generally located on a second side of the opening. The band saw also includes a first wheel supported by the first deck portion, a second wheel supported by the second deck portion and a motor operably coupled to the first wheel. The band saw also includes a single handle providing a single grip for a user to hold the band saw with only one hand and a continuous blade supported by the first and second wheels, the continuous blade having a cutting edge, wherein the continuous blade includes a first portion positioned in the cut zone for performing a cutting operation and a second portion positioned outside of the cut zone. The band saw also includes a blade guard positioned proximate the cutting edge of the second portion of the continuous blade to substantially provide a barrier between the cutting edge and an exterior of the band saw.

Other features and aspects of the invention will become apparent by consideration of the following detailed description and accompanying drawings.

Figure 1:
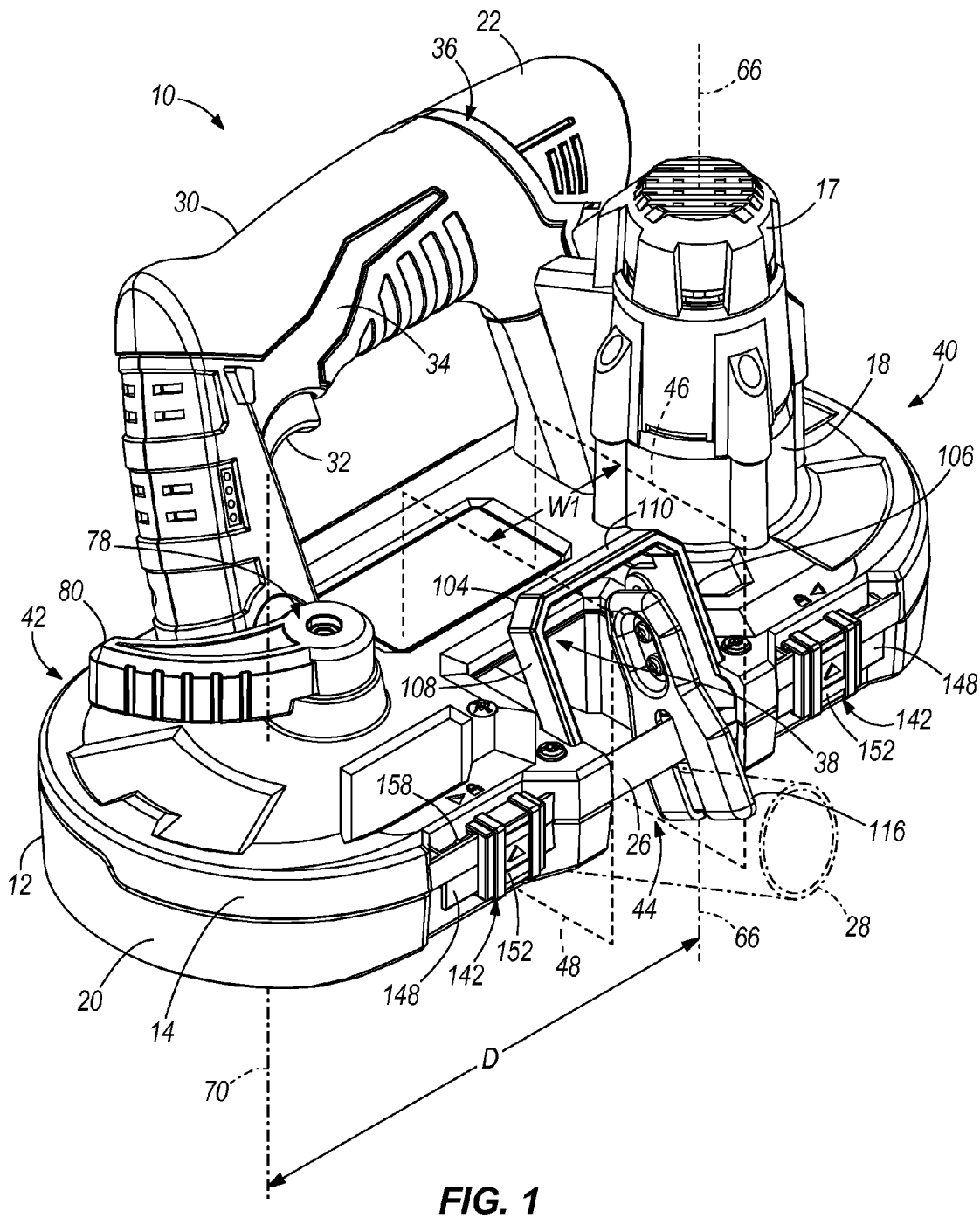
FIG. 1 is a top perspective view of a band saw according to one construction of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-16 illustrate a band saw 10 having a frame or housing 12 according to one construction of the invention. The housing 12 includes a deck 14 supporting a motor 16 (FIG. 14) and a gear box 18 and a blade guard 20 coupled to the deck 14. In the illustrated construction, the motor 16 is configured as a DC motor, and the band saw 10 includes removable, rechargeable battery 22 to deliver power to the motor 16. The motor 16 is enclosed by a housing 17, preferably formed of plastic. The gear box 18 is preferably formed of a metal. Other suitable materials may be employed.

The motor 16 is drivingly connected to a drive assembly 24 (FIG. 14) at least partially housed within the gear box 18. The drive assembly 24 may include any of a number of different gear train arrangements configured to provide a low-speed, high-torque output from the high-speed, low-torque input provided by the motor 16. The motor 16 and the drive assembly 24 are operable to drive a continuous band saw blade 26 having a cutting edge 114 to cut a workpiece 28.

Figure 2:
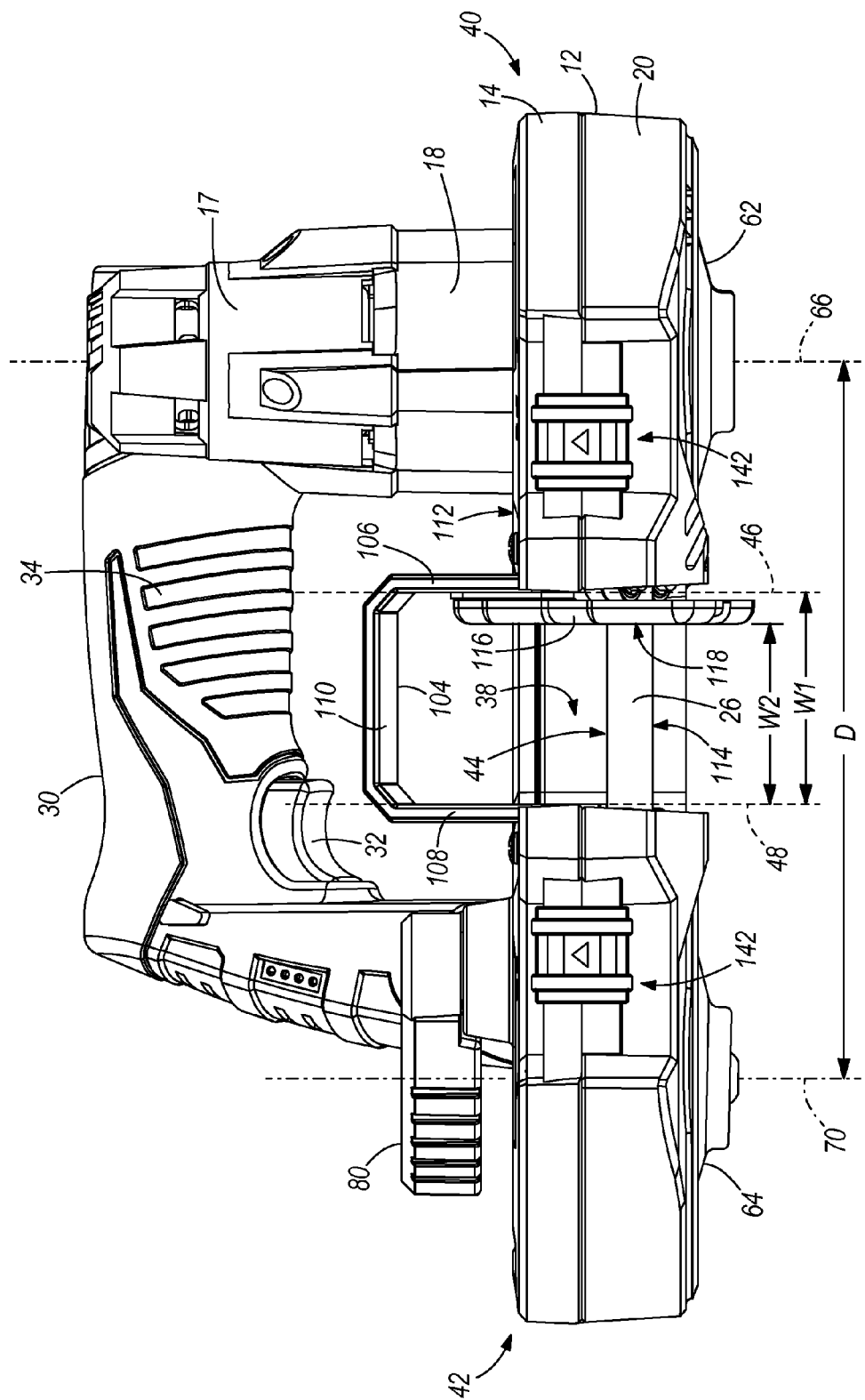
FIG. 2 is a front view of the band saw shown in FIG. 1.
Figure 3:
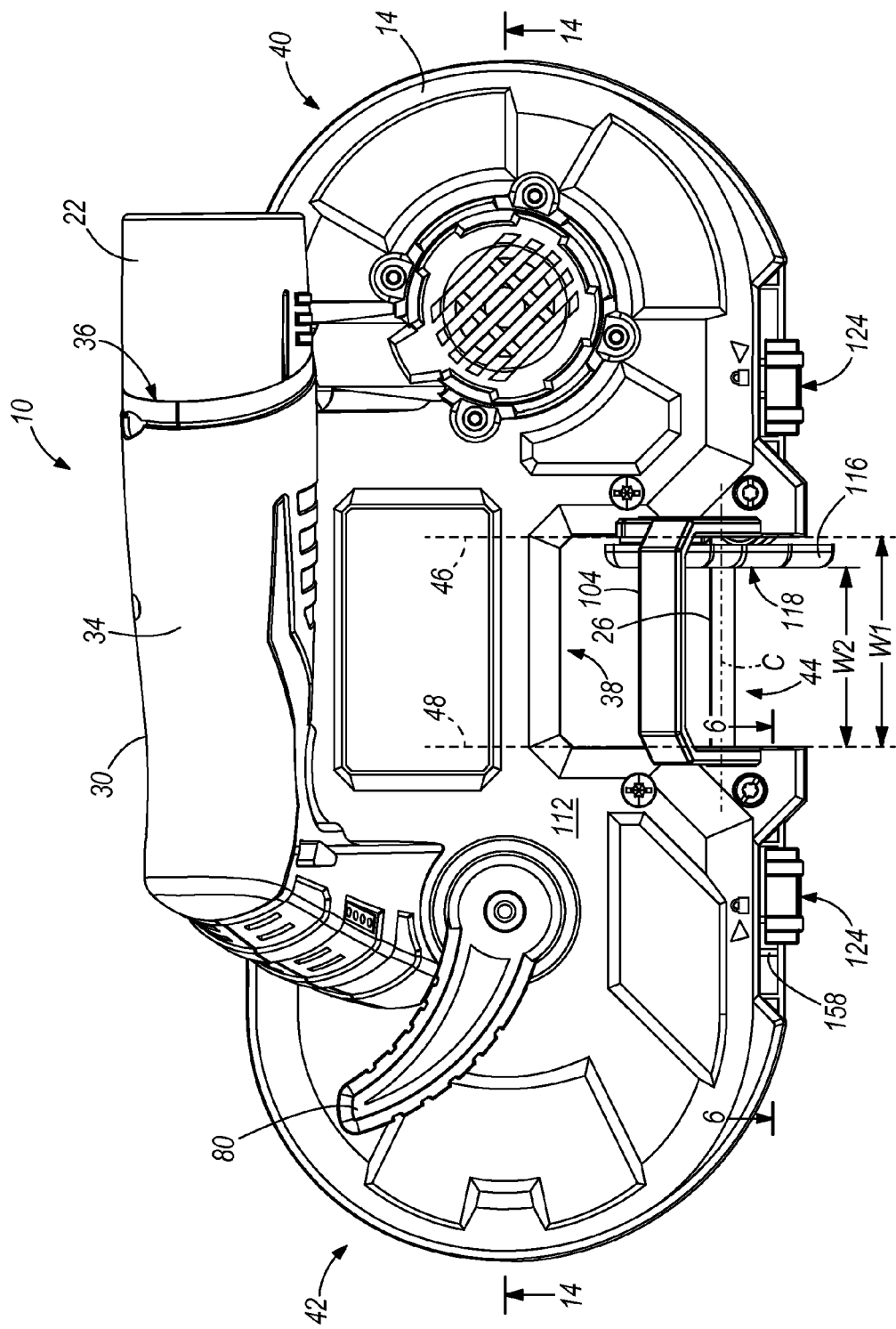
FIG. 3 is a top view of the band saw shown in FIG. 1.

With particular reference to FIGS. 1-3, the housing 12 includes a single handle 30 supporting a trigger switch 32 to provide power to the band saw 10. The switch 32 is operable to control operation of the motor 16. Generally, the handle 30 is shaped and arranged for one-handed operation of the band saw 10 as the workpiece 28 is cut. The handle 30 includes a grip portion 34 adjacent the trigger 32. The grip portion 34 is shaped for accommodating a gripping action by the user's hand during operation of the band saw 10.

In the illustrated construction, the battery 22 is a 12-volt power tool battery coupled to the handle 30. The battery 22 is coupled to a portion of the handle 30 adjacent the grip portion 34. The battery 22 is coupled to the handle 30 by inserting a portion of the battery 22 within a portion of the handle 30, i.e., a cavity or recess 36 formed in the handle 30 for receiving the battery 22. In further constructions, the battery 22 may be coupled to the handle 30 by sliding, snapping, rotating, or the like. The recess 36 also includes a terminal assembly (not shown) for electrically connecting the battery 22 to the band saw motor 16 via an electrical circuit (not shown). The battery 22 includes Lithium-ion battery cells. In other constructions of the band saw 10, the battery 22 may have higher or lower nominal voltage. Additionally or alternatively, the battery cells may have chemistries other than Lithium-ion such as, for example, Nickel Cadmium, Nickel Metal-Hydride, or the like. In other constructions, other sources of power, such as a power cord to provide AC power to an AC motor, may be employed.

With particular reference to FIG. 3, the housing 12, and more particularly the deck 14 and the guard 20, defines an opening or U-shaped cavity 38. A first housing portion 40 is generally defined to one side of the opening 38 and a second housing portion 42 is generally defined to the opposite side of the opening 38. The opening 38 receives the workpiece 28 and includes a cut zone 44 in which the workpiece 28 is cut by a portion of the band saw blade 26 that is located in the opening 38. With particular reference to FIG. 1, the opening 38 is delimited by first and second parallel, facing planes 46, 48 that are substantially normal to the portion of the band saw blade 26 positioned in the opening 38. The portion of the saw blade 26 positioned in the opening 38 defines a cutting axis C intersecting each of the planes 46, 48 and is oriented substantially normal to each of the planes 46, 48 between the respective planes 46, 48. The opening 38 has a width W1 defined as the perpendicular distance between the first and second planes 46, 48.

The handle 30 extends from a top of the deck 14 on a side of the deck opposite the cutting edge 114 of the blade 26, and extends from the first housing portion 40 on one end and the second housing portion 42 on the other end. Thus, the handle 30 extends between the first housing portion 40 and the second housing portion 42. The handle 30 is positioned at the rear of the band saw 10 opposite the cut zone 44. The grip portion 34 is positioned substantially between the first and second planes 46, 48. The grip portion 34 is adjacent the trigger 32 and configured to be grasped by an operator's hand. The trigger 32 is also at least partially positioned between the first and second planes 46, 48. In other constructions, the trigger 32 may be positioned outside of the first and second planes 46, 48 and adjacent or near one of the first and second planes 46, 48.

Figure 5:
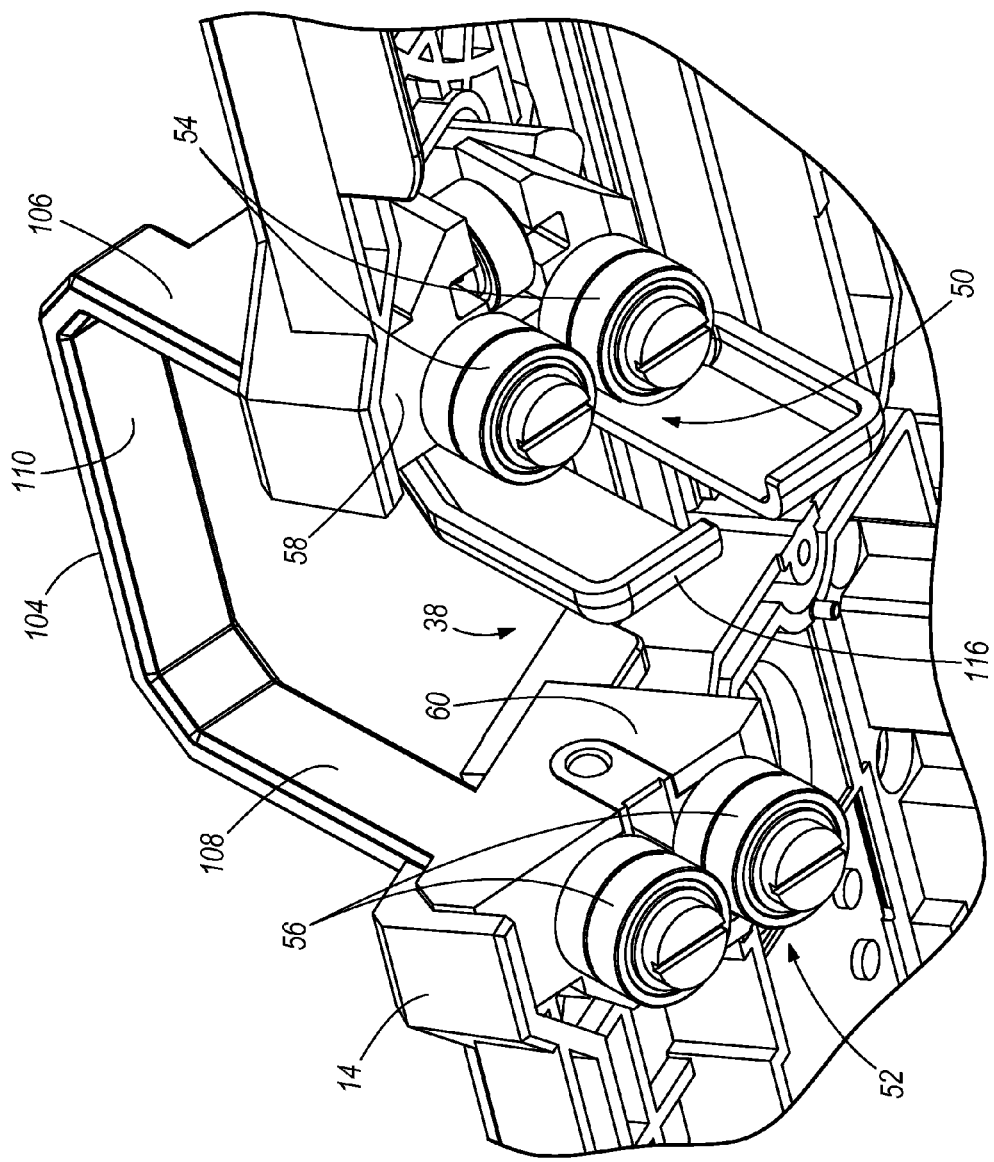
FIG. 5 is a bottom perspective view of a portion of the band saw shown in FIG. 1.

Referring to FIG. 5, the band saw 10 includes a first guide roller set 50 disposed on one side of the cavity 38 adjacent the first plane 46 and on the first housing portion 40, and a second guide roller set 52 disposed on an opposite side of the cavity 38 adjacent the second plane 48 and on the second housing portion 42. Each of the guide roller sets 50, 52 includes a pair of aligned rollers 54, 56, respectively, with which opposite sides of the saw blade 26 are engaged and a respective mounting block 58, 60 to which the rollers 54, 56 are rotatably supported. The mounting blocks 58, 60 are coupled to the deck 14 (e.g., using fasteners). The first and second guide roller sets 50, 52 support the band saw blade 26 as the blade 26 enters and exits the cut zone 44.

Figure 7:
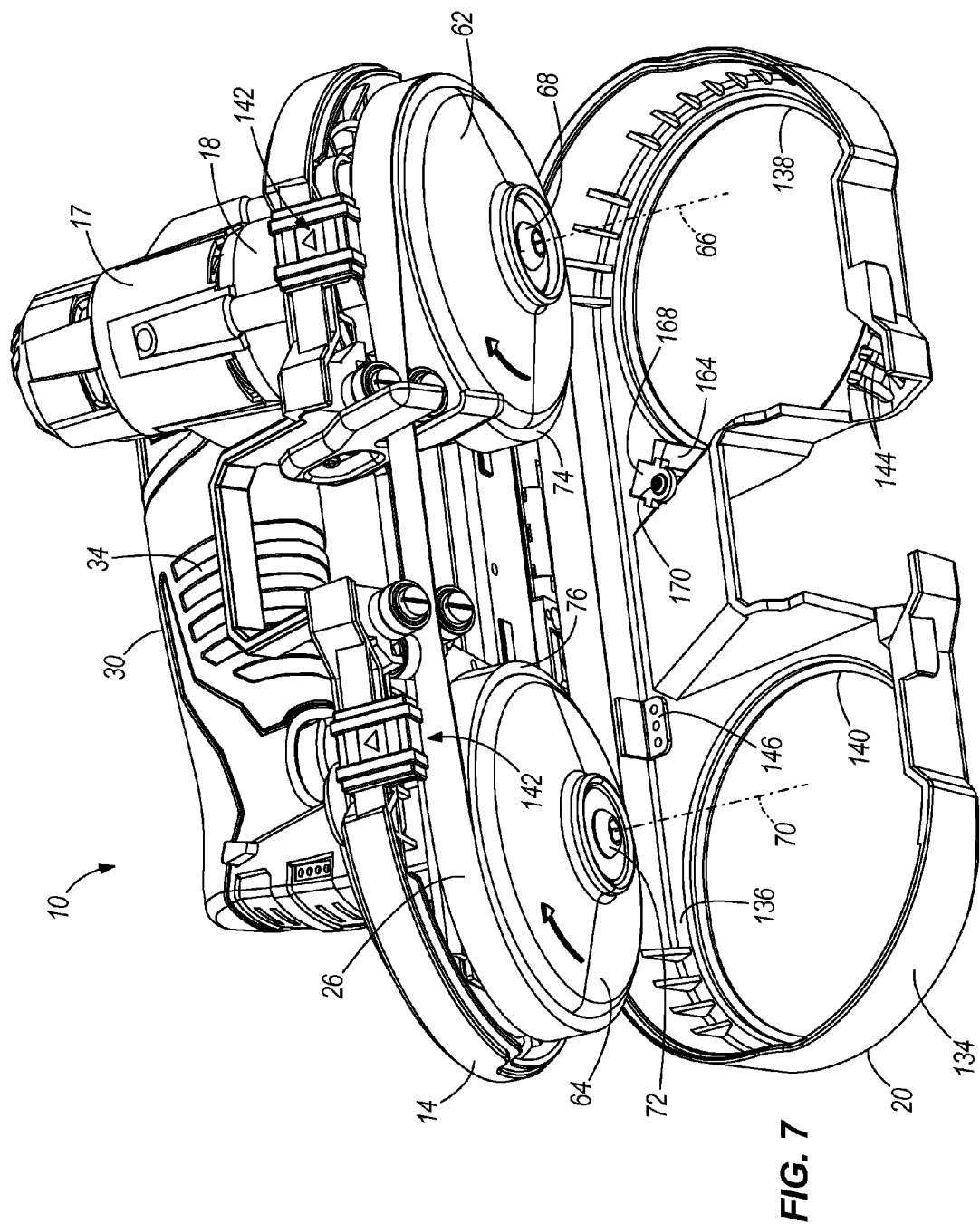
FIG. 7 is a bottom perspective view of the band saw of FIG. 1 shown in an open position.
Figure 8:
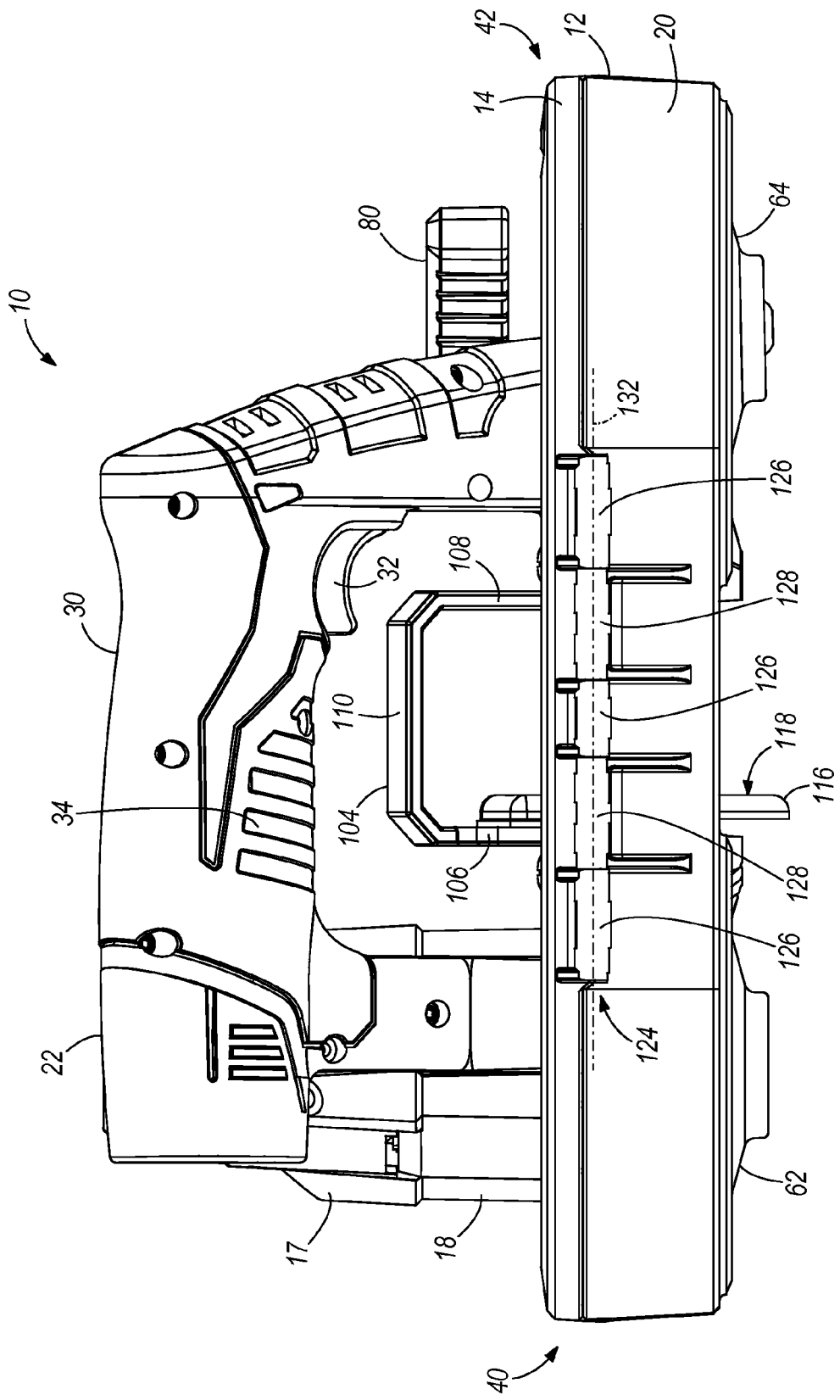
FIG. 8 is a rear view of the band saw shown in FIG. 1.

With reference to FIG. 7, the band saw 10 includes a drive wheel 62 and a driven wheel 64. The drive wheel 62 is generally disposed in the first housing portion 40 and the driven wheel 64 is generally disposed in the second housing portion 42. The drive wheel 62 rotates about a drive wheel axis 66 defined by a drive wheel axle 68 and is drivingly connected to the motor 16 via the drive assembly 24 in the gear box 18. The driven wheel 64 rotates about a driven wheel axis 70 defined by a driven wheel axle 72 and is rotatably supported by the deck 14. A distance D (FIG. 1) between the driven wheel axis 70 and the drive wheel axis 66 is approximately 6.75 inches, and the drive and driven wheels 62, 64 each have a diameter of approximately 3.5 inches. In other constructions, the band saw 10 may be smaller or larger.

A drive tire 74 and a driven tire 76 are coupled to the periphery of the respective drive wheel 62 and the driven wheel 64. Each of the tires 74, 76 is a circular-shaped ring formed of a soft and/or flexible elastomeric material that is able to lock or adhere to the drive wheel 62 or the driven wheel 64. The band saw blade 26 extends around the drive wheel 62 and the driven wheel 64 and grips the tires 74, 76 and, as a result, motion from the drive wheel 62 is transmitted to the band saw blade 26 via the wheel tires 74, 76.

With reference to FIGS. 1 and 13-16, the band saw 10 also includes a blade tensioning mechanism 78 coupled to the deck 14 to adjustably provide appropriate tension on the band saw blade 26. The blade tensioning mechanism 78 is operable to move the driven wheel axle 72 closer to or farther away from the drive wheel axle 68 in order to decrease or increase the tension in the band saw blade 26, respectively. Specifically, the blade tensioning mechanism 78 includes a lever 80 having a pivot axis 82 and an eccentric lobe 84 coupled to the lever 80 and defining a central axis 86 that is parallel to and non-coincident with the pivot axis 82.

The blade tensioning mechanism 78 also includes a spring guide 88, preferably formed by stamping, having guide pins 90 formed as one piece therewith. The tensioning mechanism 78 also includes springs 92, such as coil springs, each of which is disposed about one of the guide pins 90, and a lobe guide 94 for receiving the eccentric lobe 84. The lobe guide 94 is coupled to and positioned in sliding relationship with the guide pins 90 and is limited, or stopped, at one end of the guide pins 90 by stops 96. One free end of each spring 92 abuts the spring guide 88 and another free end of each spring 92 abuts the lobe guide 94.

The driven wheel axle 72 is fastened to the spring guide 88 by way of a threaded fastener 98 and tilting blocks 100, 102. The tilting blocks 100, 102 include angled seats 101, 103 (FIG. 15), respectively, for receiving the threaded fastener 98 at a slight angle with respect to the drive wheel axis 66 for tiling the driven wheel axle 72 at the slight angle. For example, the driven wheel axle 72, and therefore the driven wheel axis 70, is tilted at an angle of about 1 to 3 degrees with respect to the drive wheel axis 66, and preferably about 1.25 degrees. The tiling of the driven wheel 64 provides an improved grip between the band saw blade 26 and the tire 76.

When the lever 80 is rotated such that the eccentric lobe 84 moves in an arcuate path in a direction towards the drive wheel 62, the eccentric lobe 84 pulls the lobe guide 94 towards the drive wheel 62. The lobe guide 94 thereby abuts the stops 96 and pulls the spring guide 88 towards the drive wheel 62, which pulls the driven wheel 64 towards the drive wheel 62, thus creating slack in the blade 26. Conversely, when the lever 80 is rotated such that the eccentric lobe 84 moves in an arcuate path in a direction away from the drive wheel 62, the eccentric lobe 84 pushes the lobe guide 94 towards the springs 92. The lobe guide 94 moves against the bias of the springs 92, which in turn pushes the driven wheel 64 away from the drive wheel 62, thereby creating tension in the blade 26.

With reference to FIGS. 1-4, the band saw 10 includes a bridge 104, or workpiece guard, for limiting the range of movement of the workpiece 28 after a cutting operation. The bridge 104 includes a U-shaped member extending from the housing 12, and specifically from the deck 14, in a direction away from the blade 26, or away from the opening 38. The U-shaped member includes first and second portions 106, 108 extending from the deck 14 and a third portion 110 extending between the first and second portions 106, 108. The first portion 106 extends from the deck 14 on the first housing portion 40 in a direction substantially perpendicular to the cutting axis C. The second portion 108 extends from the deck 14 on the second housing portion 42 in a direction substantially perpendicular to the cutting axis C. The third portion 110 extends between the first and second portions 106, 108 in a direction substantially perpendicular to the first and second portions 106, 108. In other constructions, one of the first and second portions 106, 108 may be absent such that the third portion 110 is cantilevered from the other of the first and second portions 106, 108.

As is best illustrated in FIG. 2, the third portion 110 of the bridge 104 is disposed between an upper surface 112 of the deck 14, i.e., the surface facing the handle 30, and the handle 30. The third portion 110 is positioned at a perpendicular distance from the cutting edge 114 (FIG. 2) of the blade 26 at least equal to a width W2 of the cut zone 44. The width W2 of the cut zone is defined as the perpendicular distance between a support surface 118 of a shoe 116 (which will be described in greater detail below) and the second plane 48. As such, the workpiece 28 is provided with enough space for the cutting operation to be completed without the bridge 104 limiting the cut. In a preferred construction, the width W2 is between approximately 1.5 and 1.8 inches, and is preferably approximately 1.65 inches.

Figure 4:
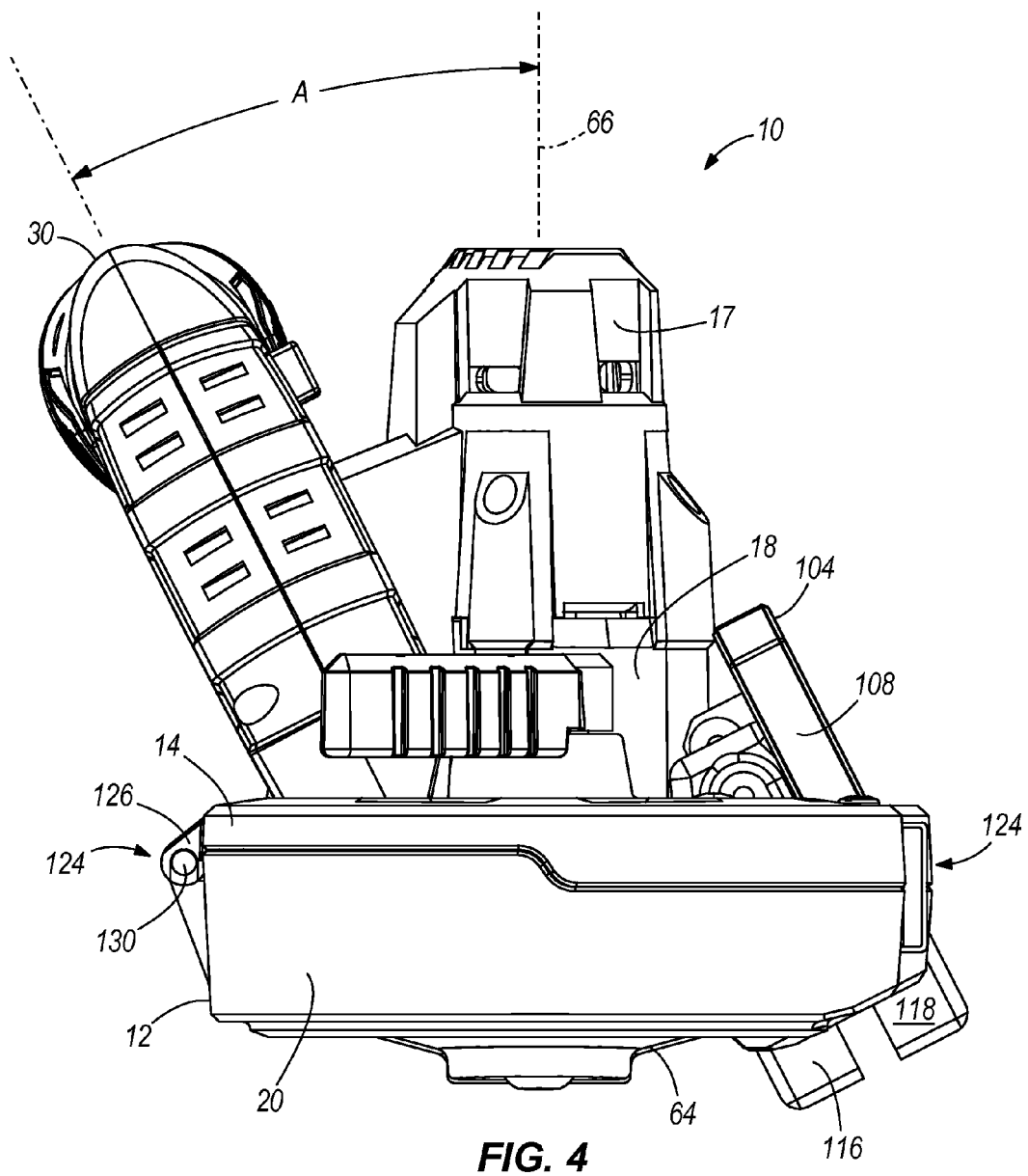
FIG. 4 is a left side view of a band saw shown in FIG. 1.

The bridge 104 spans the opening 38 between the first housing portion 40 and the second housing portion 42, or, in other words, between the first and second planes 46, 48. As best shown in FIG. 5, the bridge 104 is integrated, or formed as one piece, with the mounting blocks 58, 60 to which the guide roller sets 50, 52 are attached. This structure provides rigidity to the band saw 10 between the first housing portion 40 and the second housing portion 42. In other constructions, the bridge 104 may be formed as a separate piece from the mounting blocks 58, 60 and may be coupled to the mounting blocks 58, 60 or coupled directly to the deck 14. As best shown in FIG. 4, the bridge 104 is angled with respect to the drive wheel axis 66 at an angle similar to an angle of the blade 26 in the cut zone 44 and to an angle A of the handle 30 with respect to the drive wheel axis 66. In one construction, the angle A is between approximately 20 and 35 degrees and is preferably approximately 27 degrees. Other suitable angles may be employed.

The band saw 10 also includes a shoe 116 having a support surface 118 against which the workpiece 28 is abutted during a cutting operation. Best illustrated in FIG. 10, the shoe 116 is fastened to the band saw 10 by way of threaded fasteners 120, such as screws. The bridge 104 includes a shoe-receiving boss 122 to which the shoe 116 is fastened by the screws 120. The shoe-receiving boss 122 includes three apertures 123 for receiving the screws 120, and the shoe 116 includes two apertures 125 for receiving the screws 120, such that the shoe 116 is securable in two different positions with respect to the bridge 104.

With particular reference to FIGS. 7-9 and 12-13, the housing 12 includes the blade guard 20 pivotally coupled to the deck 14 for pivotal movement between a closed position (FIG. 1) and an open position (FIG. 7). In the illustrated construction, the blade guard 20 is formed as a separate piece from the deck 14 and is coupled to the deck 14 by way of a hinge 124 for pivotal movement relative to the deck 14. The hinge 124, such as a barrel hinge, includes barrel sections 126, 128 formed alternatingly with the deck 14 and the blade guard 20, respectively, and a pin 130 (FIG. 4) passing through the barrel sections 126, 128 and providing a pivot axis 132. In the illustrated construction, the pin 130 is formed from metal, the deck 14 and barrel sections 126 are formed as one piece from a polymer, and the blade guard 20 and barrel sections 128 are formed as one piece from a polymer. In other constructions, other suitable materials may be employed.

Figure 12:
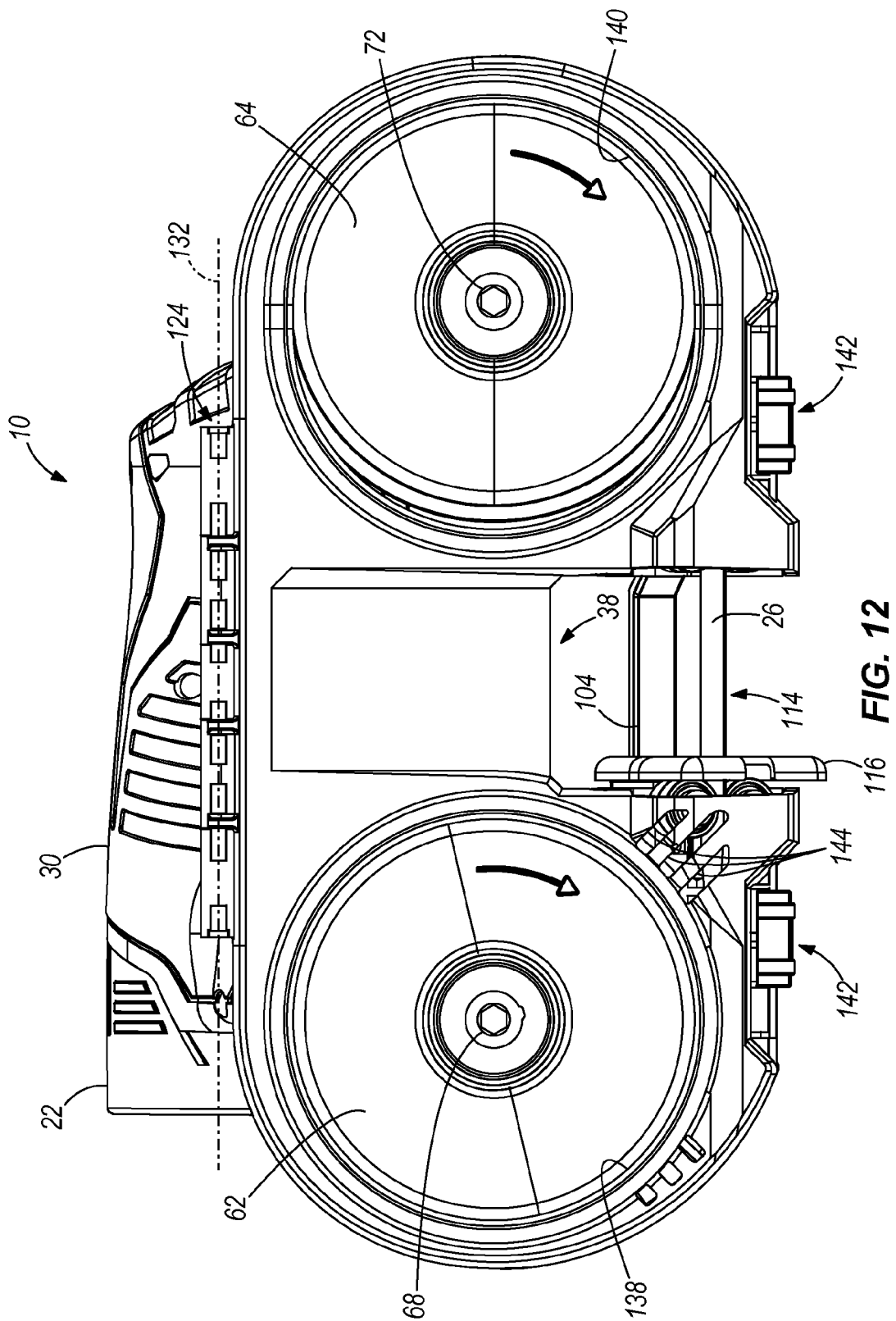
FIG. 12 is a bottom view of the band saw shown in FIG. 1.

In the closed position, the deck 14 and the blade guard 20 cooperate to substantially enclose the band saw blade 26, except the portion of the band saw blade 26 positioned in the cut zone 44 (i.e., the portion of the band saw blade 26 positioned in the opening 38 and between the first and second planes 46, 48). The portion of the blade 26 not positioned in the cut zone 44 is substantially enclosed, or inaccessible, when the housing 12 is in the closed position. The blade guard 20 includes a side wall 134 extending about the perimeter of the band saw blade 26, and a bottom wall 136 extending from the side wall 134 to cover the cutting edge 114 of the band saw blade 26 and portions of the bottom of the drive and driven wheels 62, 64. The bottom wall 136 includes first and second openings 138, 140 positioned centrally over portions of the drive and driven wheels 62, 64, respectively. The openings 138, 140 are approximately centered about the drive axis 66 and the driven axis 70, respectively (FIG. 12). The openings 138, 140 are positioned proximate at least a portion of the drive and driven wheels 62, 64 respectively to allow chips and debris carried by the blade 26 an outlet from the housing 12.

Figure 9:
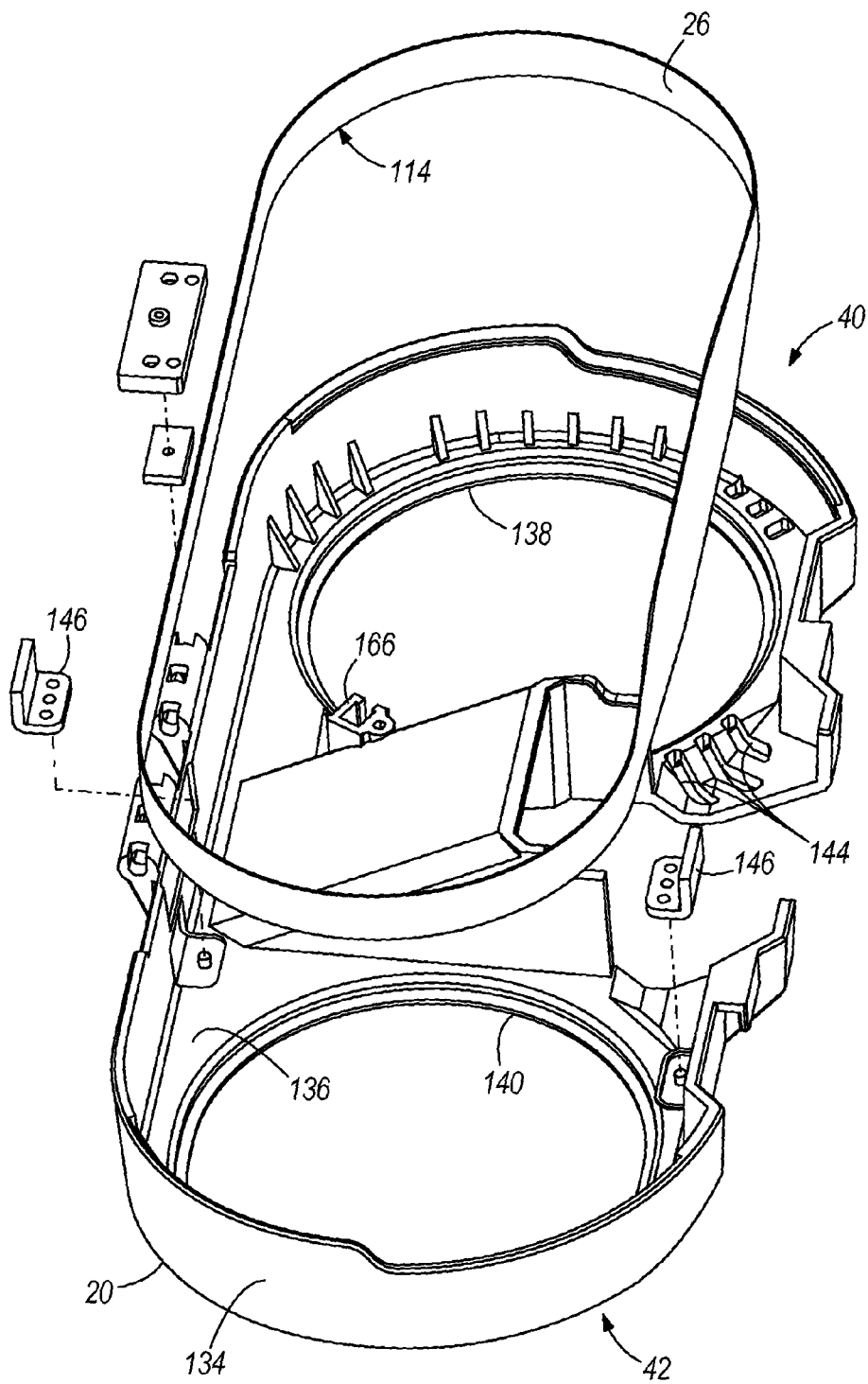
FIG. 9 is an exploded view of a portion of the band saw shown in FIG. 1.
Figure 10:
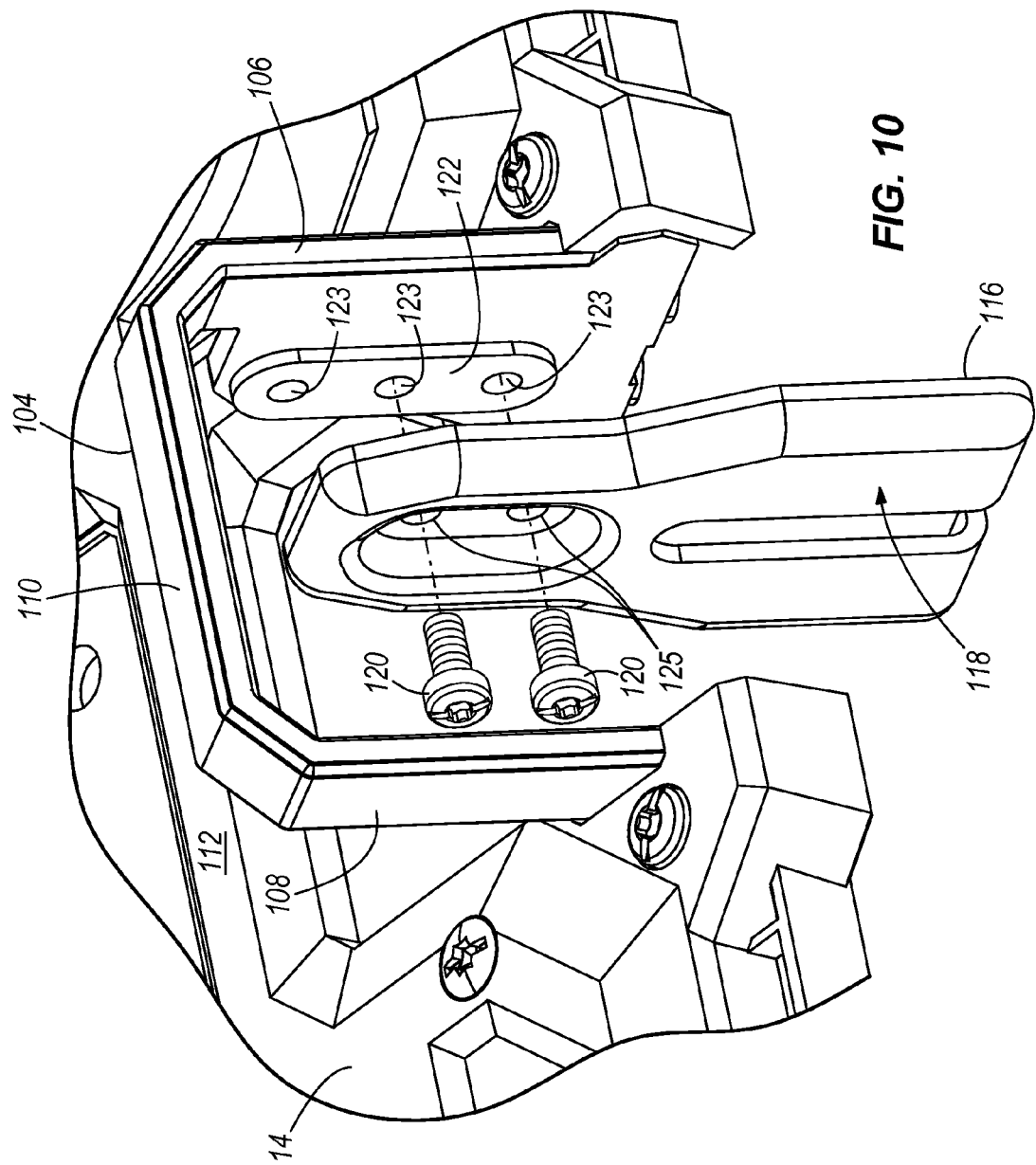
FIG. 10 is an exploded view of a portion of the band saw shown in FIG. 1.

With reference to FIGS. 7, 9 and 12, the blade guard 20 includes chip vents 144 adjacent the blade 26 as the blade exits the cut zone 44. In the illustrated construction, the chip vents 144 are positioned on the first housing portion 40 proximate the drive wheel 62 and the shoe 116. The chip vents 144 provide an outlet for chips and debris from the housing 12. With particular reference to FIGS. 7 and 9, wear plates 146 are received on an inner surface of the blade guard 20 adjacent the cutting edge 114 of the blade 26 for preventing the blade 26 from cutting through the blade guard 20. The wear plates 146 are preferably formed of a metal, such as steel or aluminum, or another suitable material that is harder than the material of the blade guard 20. In the illustrated construction, the wear plates 146 are located on the second housing portion 42, or driven wheel side of the blade guard 20. In other construction, the wear plates 146 may additionally or alternatively be positioned on the first housing portion 40, or drive wheel side of the blade guard 20.

A pair of latches 142 couple the blade guard 20 to the deck 14 in the closed position. The latches 142 are substantially mirror images of the each other. The latches 142 each include a deck lip 148 (FIG. 13) generally extending from the deck 14 and disposed at outer ends of the latches 142 with respect to the opening 38, a guard lip 150 extending from the blade guard 20 and disposed at inner ends of the latches 142 with respect to the opening 38 and a generally C-shaped latch member 152. The latch members 152 are slidably coupled to the deck 14 such that they are slidable between a locked position (FIGS. 1-4, 6, 12) in which the deck 14 and blade guard 20 are substantially fixed relative to one another and an unlocked position (FIG. 7) in which the blade guard 20 is free to pivot away from the deck 14 on the hinge 124. The latch members 152 slide in a direction generally perpendicular to the drive wheel axis 66.

With reference to FIG. 7, in the open position, the latch members 152 are positioned away from the opening 38 such that the latch members 152 engage, and are positioned about, the deck lips 148. With reference to FIG. 2, in the closed position, the guard lips 132 are positioned towards the opening 38 such that the latch members 152 engage, and are positioned about, the guard lips 150 to lock the blade guard 20 to the deck 14. In the closed position, the guard lips 150 are generally parallel and adjacent the deck lips 148.

Figure 6:
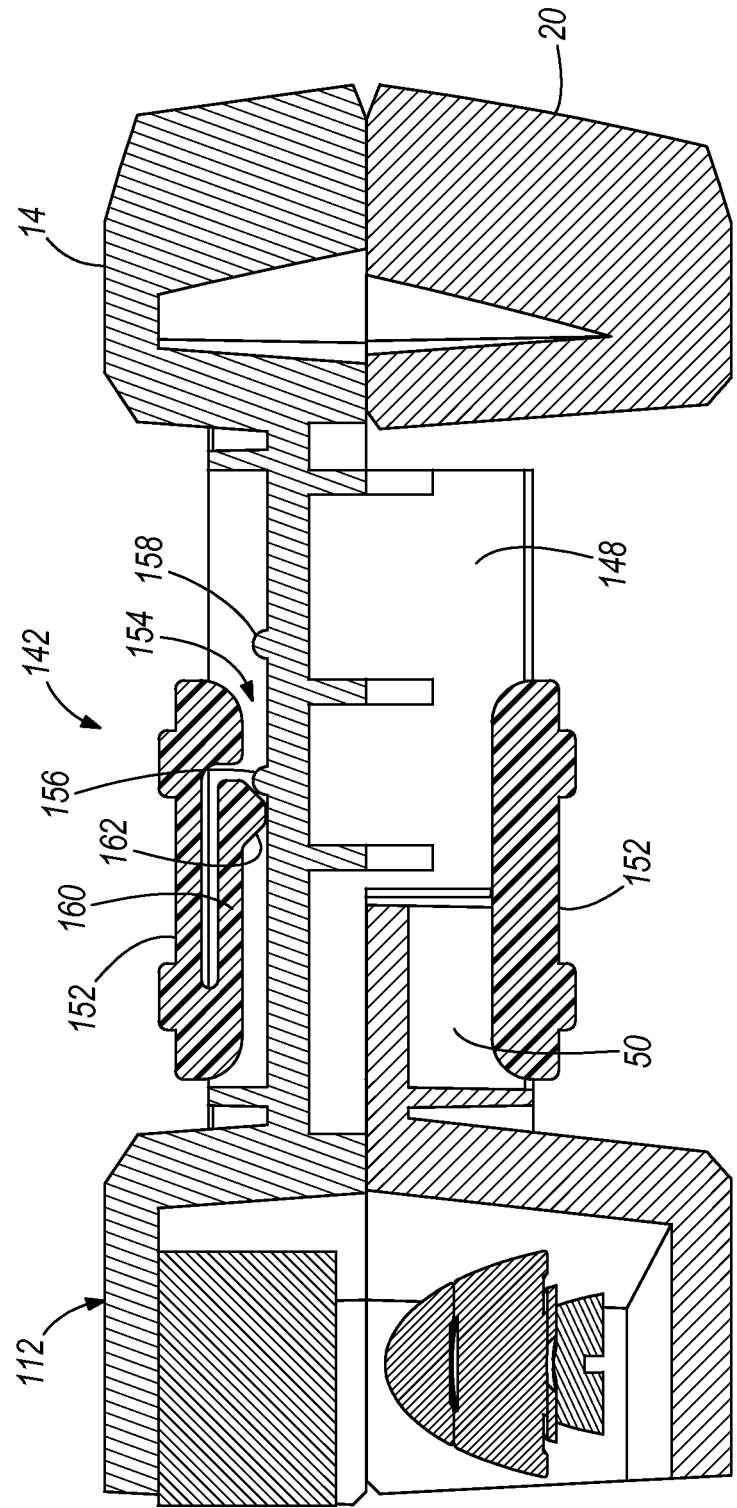
FIG. 6 is a cross section of a portion of the band saw of FIG. 3 taken along line 6-6.

FIG. 6 illustrates a cross section of the latch 142 in which the latch member 152 is in the locked position. The latch 142 includes a detent mechanism 154 that provides a threshold force below which the latch member 152 will not slide between the locked and unlocked positions. The detent mechanism 154 includes first and second projections, ribs or bumps 156, 158, respectively, formed on a surface, such as the upper surface 112, of the deck 14. A cantilevered spring arm 160 is formed on an inner surface of the latch member 152 facing the deck 14 and includes a projection 162 extending towards the deck 14, and specifically towards the bumps 156, 158. The projection 162 cooperates with the first and second bumps 156, 158 to provide the threshold force for sliding the sliding member between the locked and unlocked positions. The spring arm 160 deflects under a force greater than the threshold force such that the latch member 152 slides past the first bump 156 and subsequently the second bump 158 to the unlocked position. If the force applied is lower than the threshold force, the projection 162 abuts the first or second bump 156, 158 to inhibit the latch member 152 from sliding.

Figure 11:
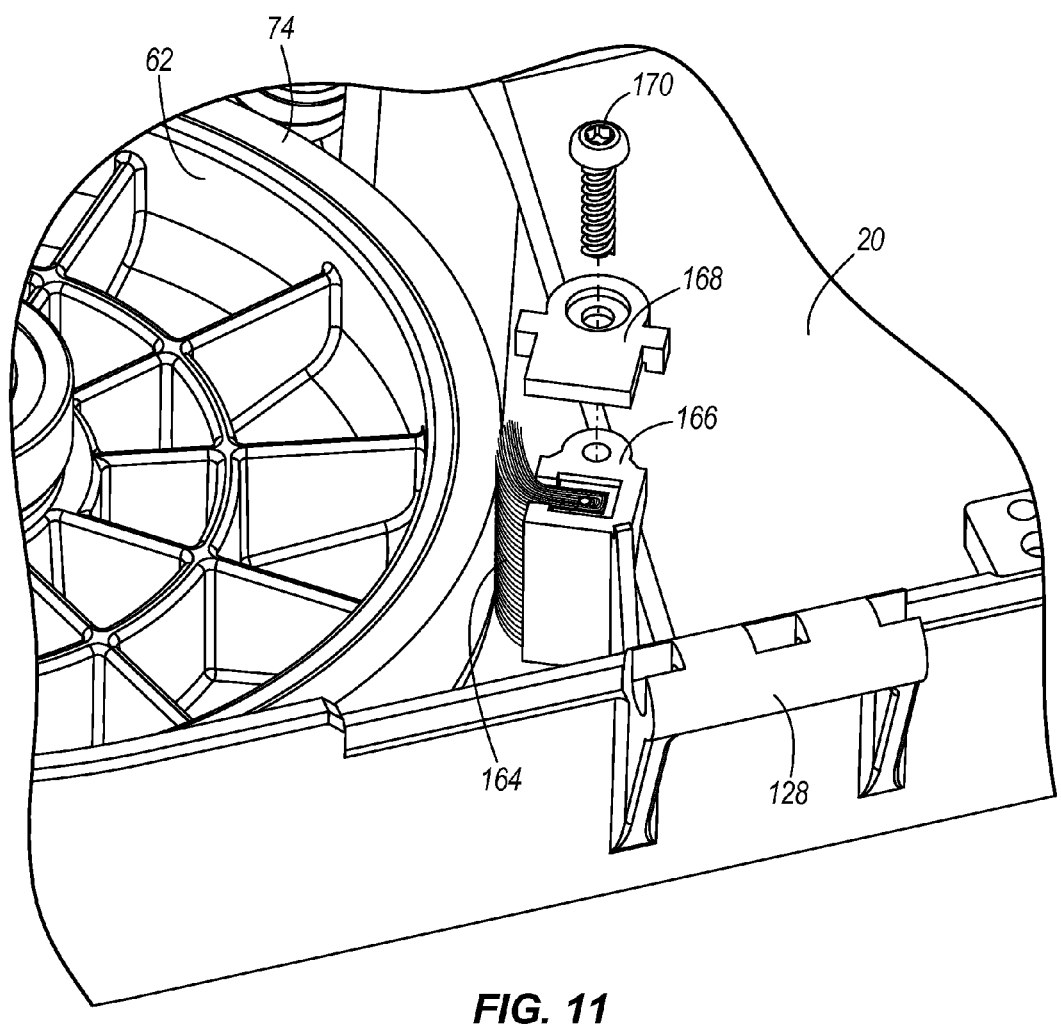
FIG. 11 is an exploded view of a portion of the band saw shown in FIG. 1.

FIGS. 7 and 11 illustrate a tire brush 164 formed from bristles made of a polymer, such as nylon. In other constructions, the bristles may be made of other polymers, metals and other suitable materials. The tire brush 164 is received in a bristle receptacle 166 extending from an inner surface of the blade guard 20 proximate the opening 138 for the drive wheel 62. The tire brush 164 is positioned in contact with the drive wheel tire 74 to clean chips and debris from the drive wheel tire 74. The tire brush 164 is sandwiched within the receptacle 166 and secured in place by a cap 168 fastened to the receptacle 166 by a fastener 170, such as a screw. The screw 170 and cap 168 are readily removable when the blade guard 20 is open for easy replacement of the tire brush 164.

Figure 13:
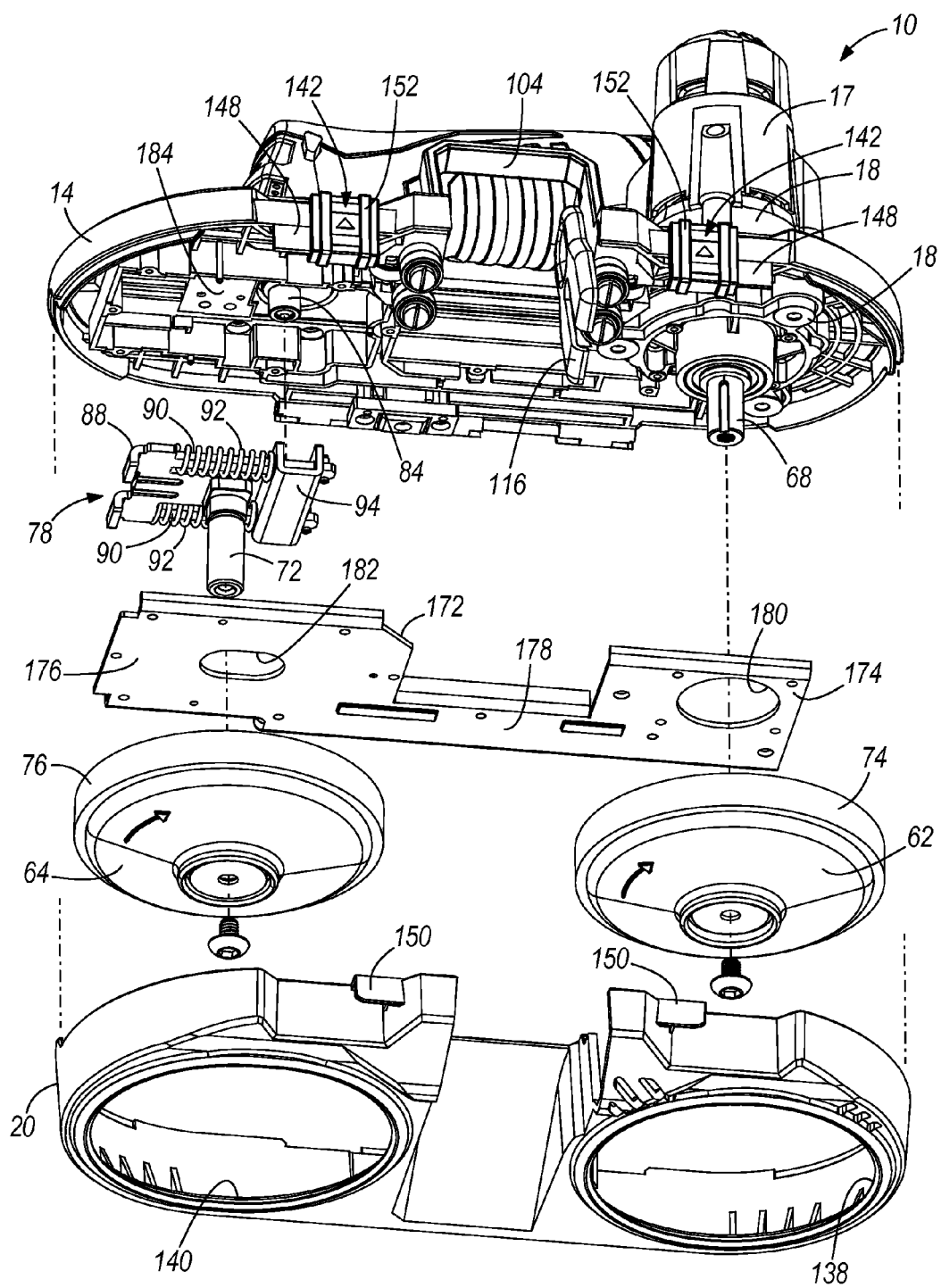
FIG. 13 is an exploded view of the band saw shown in FIG. 1.

FIG. 13 illustrates an exploded view of the band saw 10. The band saw 10 includes a reinforcement plate 172 formed of a metal and disposed between the deck 14 and the wheels 62, 64 for providing rigidity to the housing structure 12 of the band saw 10. The reinforcement plate 172 includes a drive portion 174 located proximate the drive wheel 62, a driven portion 176 located proximate the driven wheel 64 and a bridge portion 178 extending between the drive and driven portions 174, 176. The drive wheel 62 is positioned adjacent a bottom surface of the drive portion 174 and the driven wheel 64 is positioned adjacent a bottom surface of the driven portion 176. The drive portion 174 is secured to the gear box 18 by fasteners such as screws (not shown). The gear box 18 is, in turn, fastened to the deck 14. The driven portion 176 is fastened to the deck 14 by fasteners, such as screws (not shown). The drive portion 174 includes an aperture 180 for receiving the drive wheel axle 68 therethrough, and the driven portion 176 includes a slot 182 for receiving the driven wheel axle 72 therethrough and accommodating movement of the driven wheel axle 72 as a result of the tensioning mechanism 78.

Figure 14:
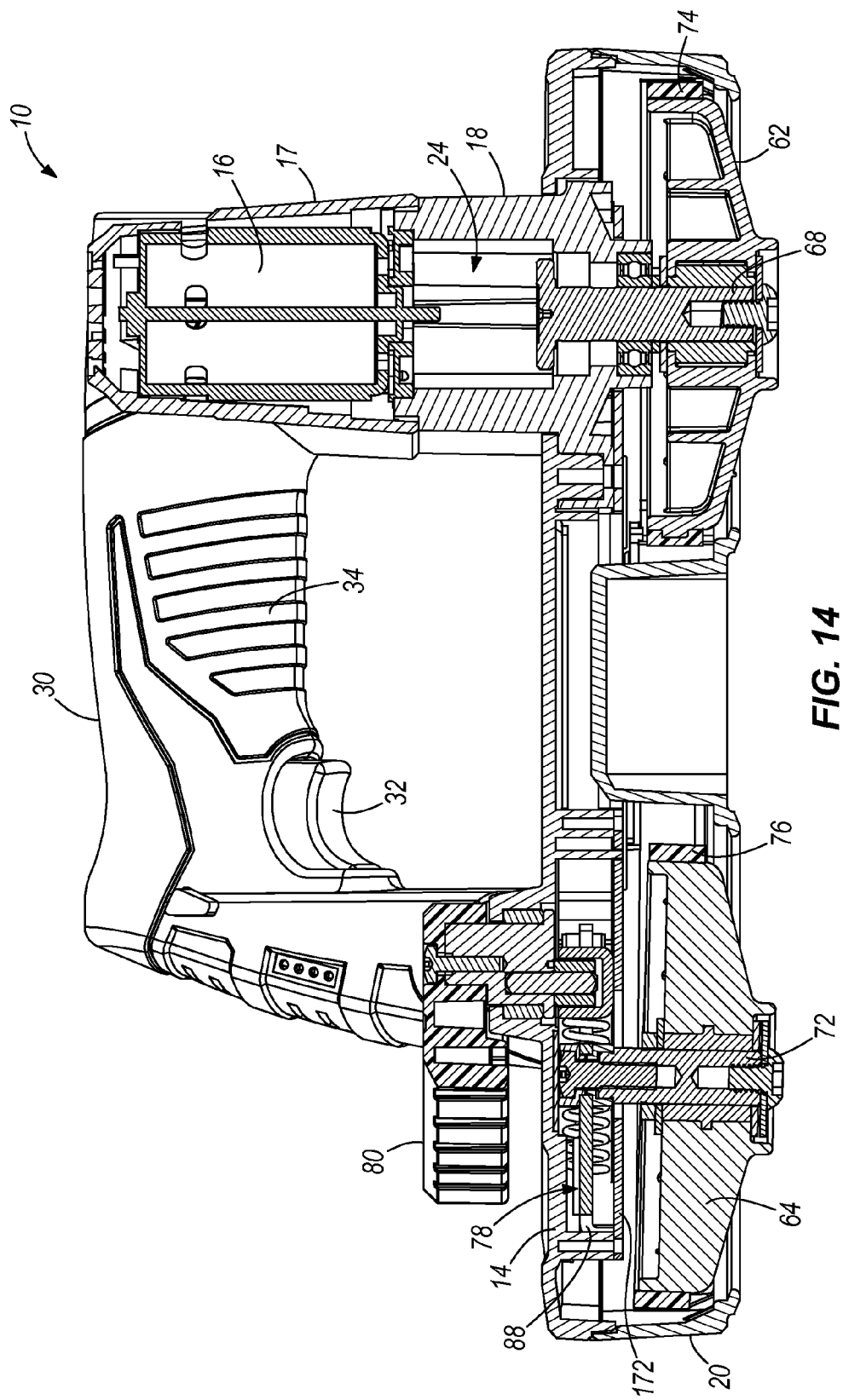
FIG. 14 is a cross section of the band saw of FIG. 3 taken along line 14-14.
Figure 15:
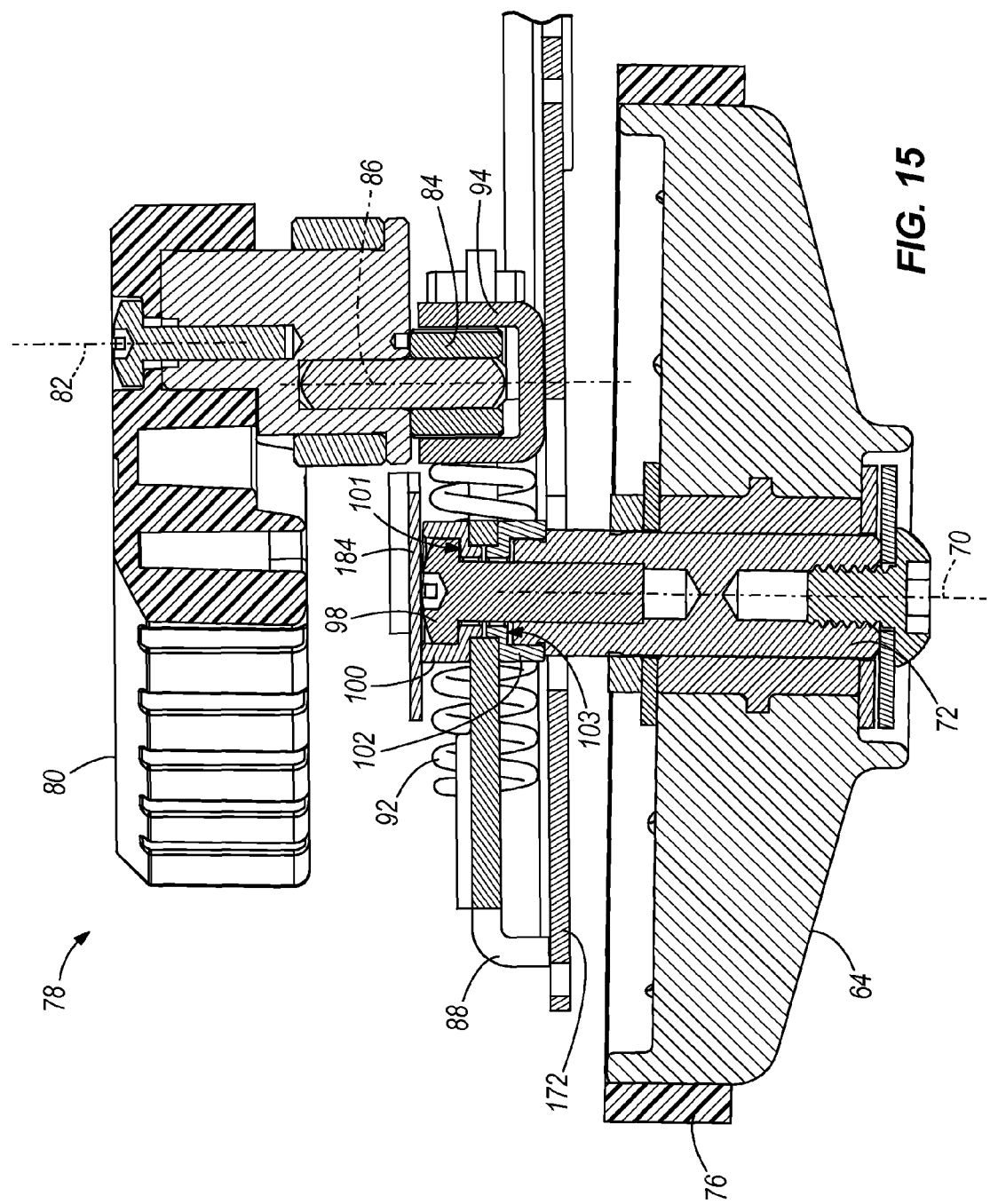
FIG. 15 is an enlarged view of a portion of the cross section of FIG. 14.
Figure 16:
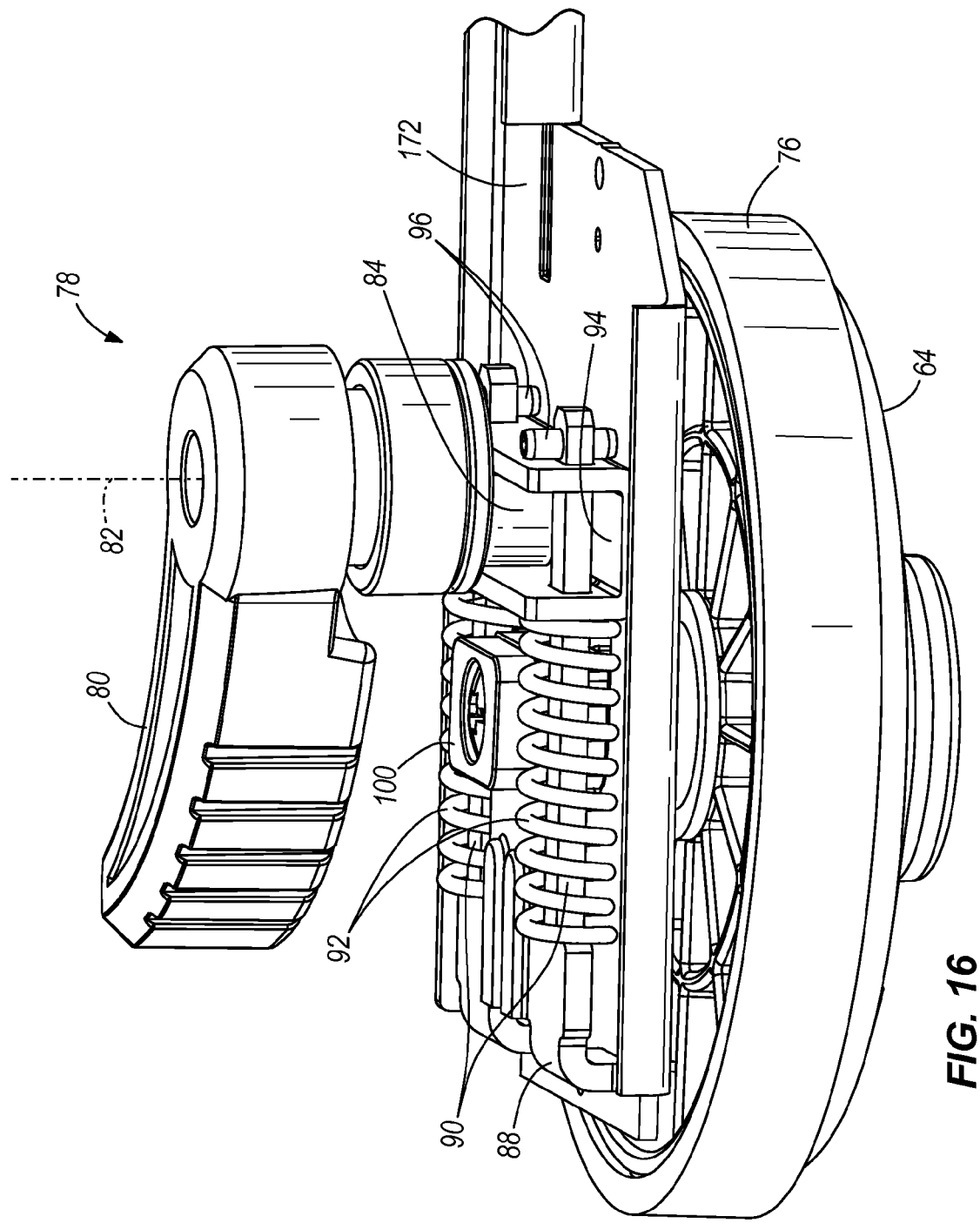
FIG. 16 is a perspective view of a tensioning mechanism of the band saw shown in FIG. 1.

The tensioning mechanism 78 is trapped in a space between the driven portion 176 of the reinforcement plate 172 and an inner surface of the deck 14. With reference to FIGS. 14 and 15, a distal end of the spring guide 88 abuts the reinforcement plate 172 to inhibit the tensioning mechanism 78 from tilting in a first direction, and the tilting block 100 bears against a metal insert 184, which is coupled to the deck 14 (FIG. 13) to inhibit the tensioning mechanism 78 from tilting in a second direction opposite the first direction. Thus, the tensioning mechanism 78 is trapped between the reinforcement plate 172 and the guard 14.

In operation of the band saw 10, an operator grips the grip portion 34 of the handle 30 with one hand and actuates the trigger 32 with the same hand. Actuation of the trigger 32 causes the motor 16 and drive assembly 24 to rotate the drive wheel 62 about the drive wheel axis 66, causing motion of the band saw blade 26 for cutting the workpiece 28 in the cut zone 44. Because the grip portion 34 is positioned at least partially between the first and second planes 46, 48 bounding the cut zone 44, or opening 38, the operator's hand is also positioned between the first and second planes 46, 48 during the cutting operation. The bridge 104 limits movement of the workpiece 28 after the cutting operation is complete. Furthermore, the guard 20 protects the cutting edge 114 of the blade 28 when the cutting edge 114 is not positioned in the cut zone 44.

Thus, the invention provides, among other things, a compact band saw having a workpiece guard and a blade guard. Various features and advantages of the invention are set forth in the following claims.

What is claimed is:

1. A hand-held band saw comprising:
   a handle for grasping the band saw;
   a motor;
   a drive wheel driven by the motor;
   a driven wheel;
   a continuous blade disposed about the drive wheel and the driven wheel;
   a cut zone, wherein a portion of the continuous blade is positioned in the cut zone to perform a cutting operation, wherein the cut zone is bounded by first and second planes oriented such that the portion of the continuous blade is substantially normal to the first and second planes; and
   a workpiece guard spaced from the continuous blade and positioned generally between the cut zone and the handle for limiting movement of a workpiece after the cutting operation, wherein the workpiece guard is disposed at least partially between the first and second planes.

2. The hand-held band saw of claim 1, further comprising a deck defining an opening in which the cut zone is located, wherein the drive wheel and the driven wheel are positioned on a first side of the deck and the workpiece guard is positioned substantially on a second side of the deck opposite the first side.

3. The hand-held band saw of claim 1, wherein the cut zone has a width measured parallel to the portion of the continuous blade, wherein the workpiece guard is spaced from a cutting edge of the continuous blade in a direction substantially perpendicular to the cutting edge by a distance at least equal to the width of the cut zone.

4. The hand-held band saw of claim 1, wherein the continuous blade defines a cutting axis in the cut zone, wherein the cutting axis generally extends along a first side of the band saw and wherein the handle generally extends along a second side of the band saw opposite the first side.

5. The hand-held band saw of claim 4, wherein the handle includes a trigger for activating the motor, wherein the trigger and the handle are positioned proximate the second side of the band saw and generally opposite the cut zone.

6. The hand-held band saw of claim 4, wherein the handle is positioned substantially between the first and second planes.

7. The hand-held band saw of claim 1, wherein the handle is positioned substantially between the first and second planes.

8. A hand-held band saw for cutting a workpiece, the hand-held band saw comprising:
a housing defining a front and a rear, the housing having an opening in the front defining a cut zone and a first housing portion generally located on a first side of the opening and a second housing portion generally located on a second side of the opening;
a first wheel supported by the first housing portion;
a second wheel supported by the second housing portion;
a motor operably coupled to the first wheel;
a handle disposed proximate the rear of the housing, the handle having a grip portion extending between the first housing portion and the second housing portion;
a continuous blade supported by the first and second wheels, wherein a portion of the continuous blade is positioned in the cut zone to perform a cutting operation; and
a workpiece guard substantially traversing the cut zone for limiting movement of a workpiece after the cutting operation.

9. The hand-held band saw of claim 8, wherein the continuous blade defines a cutting axis in the cut zone, wherein the opening generally defines first and second parallel planes substantially normal to the cutting axis, the cut zone being between the first and second planes, and wherein the grip portion is positioned substantially between the first and second planes.

10. The hand-held band saw of claim 8, wherein the workpiece guard extends from the first housing portion and the second housing portion at opposite sides of the cut zone and traverses the cut zone.

11. The hand-held band saw of claim 10, wherein the workpiece guard includes a first portion extending from the first housing portion in a direction substantially away from the portion of the continuous blade in the cut zone and a second portion extending from the second housing portion in a direction substantially away from the portion of the continuous blade in the cut zone and a third portion extending between the first and second portions.

12. The hand-held band saw of claim 11, wherein the third portion of the workpiece guard extends substantially perpendicular to the first portion and the second portion of the workpiece guard.

13. The hand-held band saw of claim 11, wherein the third portion is disposed between the cut zone and the grip portion.

14. The hand-held band saw of claim 8, further comprising:
a first guide roller set proximate the first housing portion for guiding the continuous blade at one end of the cut zone;
a second guide roller set proximate the second housing portion for guiding the continuous blade at another end of the cut zone;
wherein the first and second guide roller sets are coupled to the workpiece guard.

15. The hand-held band saw of claim 8, further comprising a shoe having a surface for abutting the workpiece during a cutting operation, wherein the shoe is coupled to the workpiece guard.

16. The hand-held band saw of claim 8, wherein the continuous blade includes a toothed cutting edge, the hand-held band saw further comprising a blade guard positioned proximate the toothed cutting edge to provide a barrier between the toothed cutting edge and an exterior of the band saw.

17. The hand-held band saw of claim 16, wherein the blade guard is hinged to the housing.

18. The hand-held band saw of claim 17, wherein the blade guard is hinged to the rear of the housing and latched to the front of the housing.

19. The hand-held band saw of claim 16, further comprising a wear plate disposed between the toothed cutting edge and the blade guard.

20. The hand-held band saw of claim 16, further comprising a chip vent formed in the blade guard for providing an outlet for workpiece chips and debris from the band saw.

21. The hand-held band saw of claim 8, further comprising a reinforcement plate formed of a rigid material and coupled to the housing for adding rigidity to the housing.

22. The hand-held band saw of claim 21, wherein the reinforcement plate includes a first portion disposed between the first wheel and the housing, a second portion disposed between the second wheel and the housing and a bridge portion connecting the first portion to the second portion.

23. The hand-held band saw of claim 22, further comprising a gear box formed of a metal for housing gears configured to couple the motor to the first wheel, wherein the first portion of the reinforcement plate is fastened to the gear box.

24. The hand-held band saw of claim 21, wherein the reinforcement plate is formed of a metal.

25. A hand-held band saw comprising:
a handle for grasping the band saw;
a motor;
a drive wheel driven by the motor;
a driven wheel;
a continuous blade disposed about the drive wheel and the driven wheel;
a cut zone, wherein a portion of the continuous blade is positioned in the cut zone to perform a cutting operation; and
a workpiece guard spaced from the continuous blade and positioned generally between the cut zone and the handle for limiting movement of a workpiece after the cutting operation;
wherein the cut zone has a width measured parallel to the portion of the continuous blade, wherein the workpiece guard is spaced from a cutting edge of the continuous blade in a direction substantially perpendicular to the cutting edge by a distance at least equal to the width of the cut zone.

26. A hand-held band saw comprising:
a handle for grasping the band saw;
a motor;
a drive wheel driven by the motor;
a driven wheel;

a continuous blade disposed about the drive wheel and the driven wheel;

a cut zone, wherein a portion of the continuous blade is positioned in the cut zone to perform a cutting operation; and a workpiece guard spaced from the continuous blade and positioned generally between the cut zone and the handle for limiting movement of a workpiece after the cutting operation;

wherein the continuous blade defines a cutting axis in the cut zone, wherein the cutting axis generally extends along a first side of the band saw and wherein the handle generally extends along a second side of the band saw opposite the first side;

wherein the cut zone defines a first plane substantially normal to the cutting axis and a second plane substantially normal to the cutting axis, wherein the cut zone is positioned between the first and second planes, and wherein the handle is positioned substantially between the first and second planes; and wherein the workpiece guard is positioned substantially between the first and second planes.

27. A hand-held band saw comprising:

a handle for grasping the band saw;

a motor;

a drive wheel driven by the motor;

a driven wheel;

a continuous blade disposed about the drive wheel and the driven wheel;

a cut zone, wherein a portion of the continuous blade is positioned in the cut zone to perform a cutting operation; and a workpiece guard spaced from the continuous blade and positioned generally between the cut zone and the handle for limiting movement of a workpiece after the cutting operation;

wherein the cut zone has a width measured substantially parallel to a cutting edge of the portion of the continuous blade, and wherein the workpiece guard is disposed within the width and is spaced from the continuous blade in a direction substantially perpendicular to the width.

* * * * *